(12) United States Patent
Cleveland et al.

(10) Patent No.: US 8,705,360 B2
(45) Date of Patent: Apr. 22, 2014

(54) STREAM CONTROL IN A MIMO-ENABLED MESH NETWORK

(75) Inventors: Joseph Cleveland, Murphy, TX (US); Cornelius van Rensburg, Dallas, TX (US); Baowei Ji, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1531 days.

(21) Appl. No.: 11/297,575

(22) Filed: Dec. 8, 2005

(65) Prior Publication Data

US 2007/0053295 A1 Mar. 8, 2007

Related U.S. Application Data

(60) Provisional application No. 60/714,319, filed on Sep. 6, 2005.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 12/26* (2006.01)
*H04J 3/16* (2006.01)

(52) U.S. Cl.
USPC ......................................... 370/235; 370/437

(58) Field of Classification Search
USPC ............. 370/231, 232, 235, 395.3, 400, 427, 370/437; 375/267; 714/758
See application file for complete search history.

(56) References Cited

U.S. PATENT DOCUMENTS

| | | | |
|---|---|---|---|
| 6,791,997 B2* | 9/2004 | Beyer et al. | 370/447 |
| 6,996,086 B2* | 2/2006 | Wolfe et al. | 370/338 |
| 7,161,907 B2* | 1/2007 | Mott | 370/232 |
| 2004/0125900 A1* | 7/2004 | Liu et al. | 375/347 |
| 2005/0192037 A1* | 9/2005 | Nanda et al. | 455/509 |
| 2006/0013177 A1* | 1/2006 | Saito | 370/338 |
| 2006/0234646 A1* | 10/2006 | Naguib et al. | 455/69 |
| 2007/0162819 A1* | 7/2007 | Kawamoto et al. | 714/758 |

OTHER PUBLICATIONS

Mischa Dohler et al., "Distributed PHY-Layer Mesh Networks," The 14th IEEE 2003 International Symposium on Personal Indoor and Mobile Radio Communication Proceedings, pp. 2543-2547.
Jack H. Winters, Eigent Technologies, LLC, "Smart Antenna Techniques and Their Application to Wireless Ad Hoc Networks," Advances in Smart Antennas, IEEE Wireless Communications, Aug. 2006, pp. 77-83.
M. Dohler et al, "Near-optimum transmit power allocation for space-time block encoded wireless communication systems," IEE Proc.-Commun., vol. 153, No. 3, Jun. 2006, pp. 459-463.

* cited by examiner

*Primary Examiner* — John Blanton
*Assistant Examiner* — Christopher Crutchfield

(57) ABSTRACT

In a multiple-input, multiple-output (MIMO) enabled mesh network, streams for transmitting data from a node to a destination node are controlled based on next hop latency and available stream capacity at neighboring, next hop nodes. Routing information maintained and dynamically updated at each node includes latency information associated with each next hop for transmission from the node to a given destination node and current available stream capacity for such next hop nodes. A controller at the node utilizes that information to select one or more next hop nodes to which the data is forwarded as well as to determine a number of streams that may be initiated with each selected next hop node.

20 Claims, 3 Drawing Sheets

STREAM CONTROL IN A MIMO-ENABLED MESH NETWORK

CROSS-REFERENCE TO RELATED APPLICATION AND CLAIM OF PRIORITY

The present application is related to U.S. Provisional Patent No. 60/714,319, filed Sep. 6, 2005, entitled "Stream Control In a MIMO Enabled Mesh Network". U.S. Provisional Patent No. 60/714,319 is assigned to the assignee of the present application and is hereby incorporated by reference into the present disclosure as if fully set forth herein. The present application hereby claims priority under 35 U.S.C. §119(e) to U.S. Provisional Patent No. 60/714,319.

TECHNICAL FIELD OF THE INVENTION

The present disclosure is directed, in general, to multiple-input, multiple-output (MIMO) enabled mesh networks and, more specifically, to scheduling bandwidth usage among neighboring cells within a MIMO-enabled mesh network.

BACKGROUND OF THE INVENTION

Wireless mesh networks typically consist of nodes transmitting to each other based on directional wireless links established by high gain, point-to-point antennas. In addition to practical constraints on channel coding schemes employed and/or regulatory constraints on transmit power, optimal use of bandwidth (or, equivalently for the purposes of this disclosure, "capacity") for such wireless links is complicated by determining how many data streams to initiate at a node with any particular neighbor node.

Multiple-input, multiple-output (MIMO) enabled networks, for example, advantageously employ multi-path scattering to establish more than one spatial channel, each carrying independent data streams, within the wireless link between two nodes. In the context of a mesh network, processing capacity may be limited relative to the maximum number of data streams that could be initiated by all of a node's neighbors. Routing algorithms for nodes with a single, omni-directional antenna are, at the very least, not optimized for wireless mesh networks with MIMO antennas.

There is, therefore, a need in the art for improved data stream control within MIMO enabled mesh networks.

SUMMARY OF THE INVENTION

An apparatus is disclosed for use in a multiple-input, multiple-output (MIMO) enabled mesh network. The apparatus provides control over streams for transmitting data from a node to a destination node, based on next hop latency and available stream capacity at neighboring, next hop nodes. Routing information maintained and dynamically updated at each node includes latency information associated with each next hop for transmission from the node to a given destination node and current available stream capacity for such next hop nodes. A controller at the node utilizes that information to select one or more next hop nodes to which the data is forwarded as well as to determine a number of streams that may be initiated with each selected next hop node.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1A:
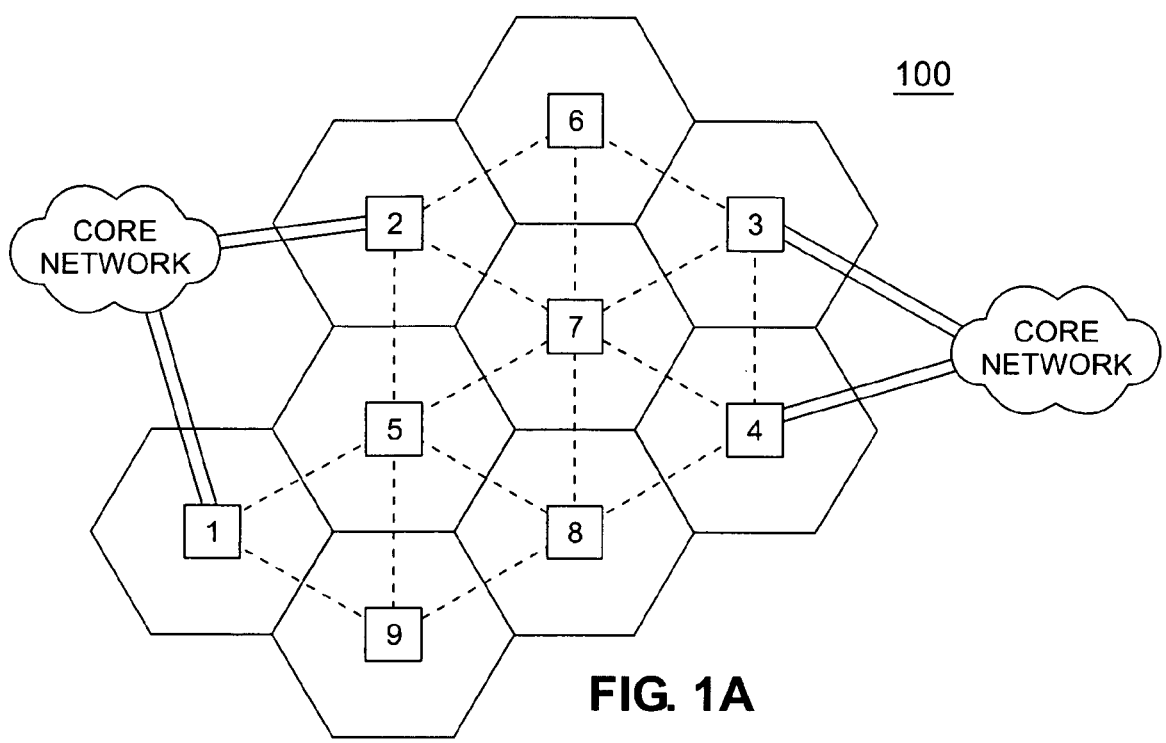
FIGS. 1A and 1B are high-level block diagrams of a multiple-input, multiple-output enabled wireless mesh network with data stream control between neighboring nodes according to one embodiment of the present disclosure.
Figure 1B:
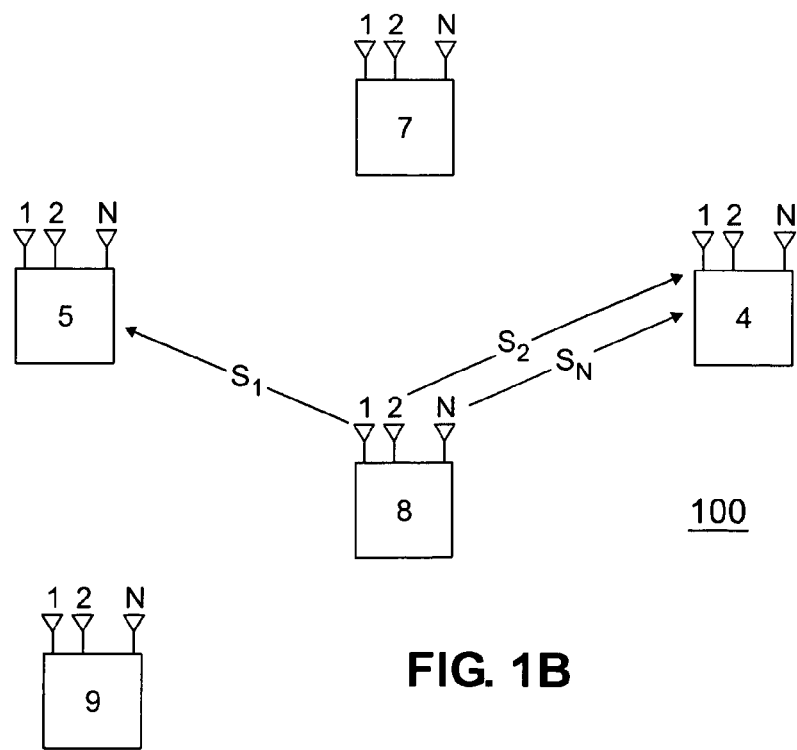
Figure 2:
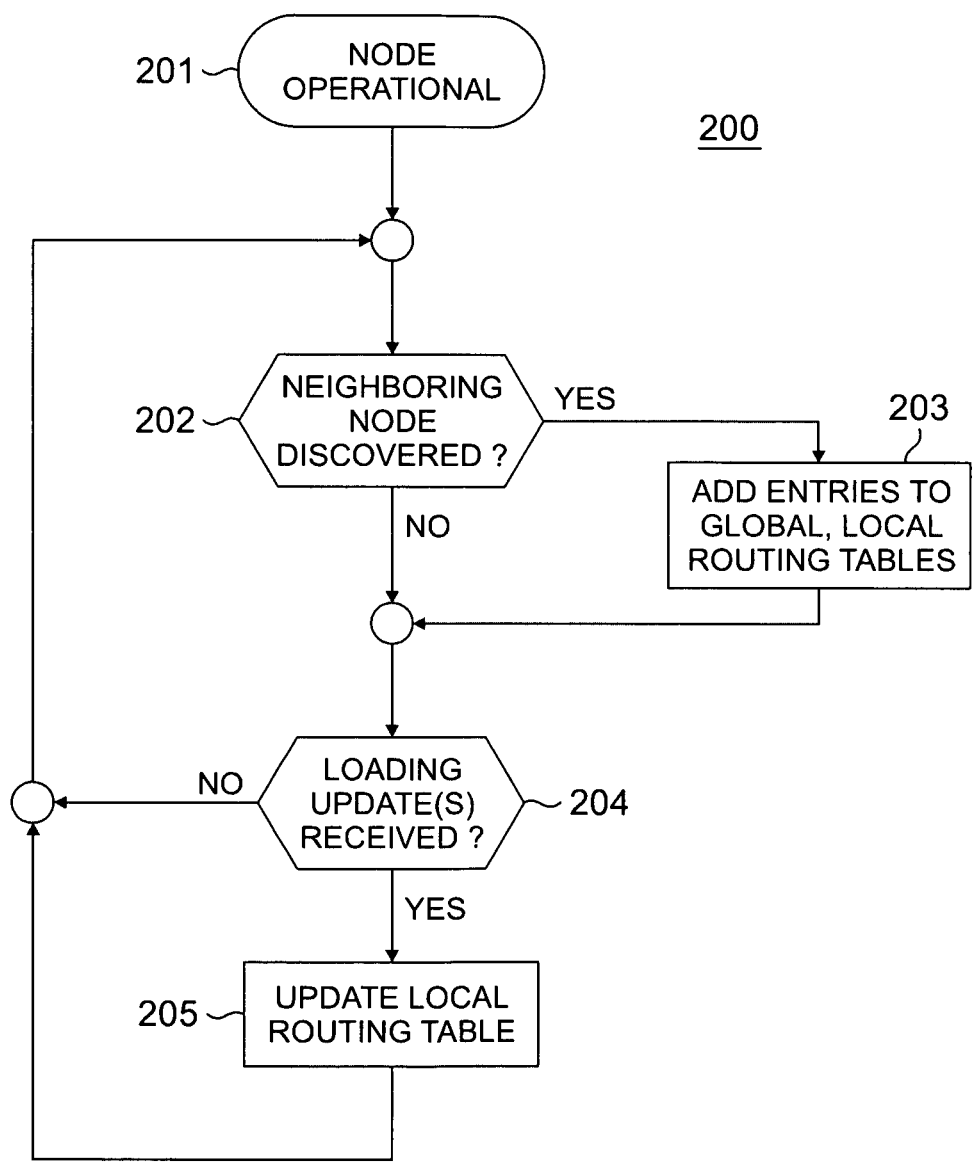
FIG. 2 is a high level flowchart for a process of creating and maintaining global and local routing tables within a multiple-input, multiple-output enabled wireless mesh network with data stream control between neighboring nodes according to one embodiment of the present disclosure.
Figure 3:
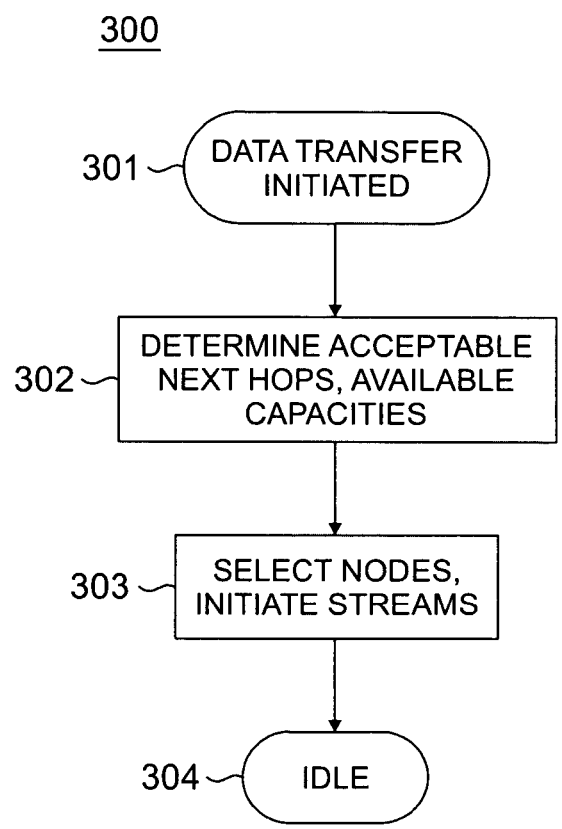
FIG. 3 is a high level flowchart for a process of scheduling streams within a multiple-input, multiple-output enabled wireless mesh network with data stream control between neighboring nodes according to one embodiment of the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

FIGS. 1A and 1B are high-level block diagrams of a multiple-input, multiple-output enabled wireless mesh network with data stream control between neighboring nodes according to one embodiment of the present disclosure. MIMO enabled mesh network 100 includes a plurality of nodes 1-9, indicated by squares in the drawing. Those skilled in the art will understand that each node includes a base transceiver station, one or more antennae, and other equipment required for that node to communicate wirelessly with other nodes within network 100. While the nodes are depicted as cells having contiguous hexagonal boundaries, the nodes may form either a fixed network as depicted or a mobile ad hoc network (MANET) in which each node discovers and communicates with other nodes in a peer-to-peer fashion as nodes move in and out of range with each other, nodes may have overlapping ranges, etc.

As noted, network 100 is preferably MIMO enabled, such that the antenna(e) at each node provides directional transmission, regardless of whether through selectable antenna elements, beamforming, or any combination of directional radio transmission techniques. Wireless links carrying voice and/or data communications between nodes 1-9 within the network 100 are depicted in FIG. 1A as dashed lines. As known in the art, such links may incorporate a number of channels within a range of frequencies, such as a control channel and at least N data channels (where N is any positive integer greater than 1).

Network 100 is also depicted as including wireline backhaul connections (depicted as a pair of solid lines in FIG. 1A) to core networks or support networks, and/or to the Internet or other data networks. Such wireline connections may be established in accordance with the known art (e.g., leased lines or point-to-point radio frequency links). In the exemplary embodiment, backhaul bandwidth may also be provided by the wireless links between nodes 1-9 as described in further detail below in order to meet the increased backhaul needs of wireless networks supporting broadband data transfer as well as voice communications. Subscriber units or other fixed or mobile devices (not shown) may optionally connect through any one of nodes 1-9 to network 100, using network 100 as a backhaul connection to the core or support network(s) and/or the Internet.

As depicted in FIG. 1B, each node 1-9 includes an array of antenna elements 1-N. Each node accordingly supports up to N MIMO antenna paths, with the capacity of multiplexing up to N streams $S_1, S_2, \ldots S_N$ to one or many of the neighboring nodes. However, the capacity of each node is bounded by the number of antenna elements within the array. In an overloaded environment, defined as one in which the number of incident co-channel signals exceeds the number of antenna elements at the receiver (the receiving node), MIMO may fail because the array's degree of freedom is exceeded. The equal power assumption (all incident data streams are assumed to have been transmitted with equal power) prohibits use of simple techniques such as successive interference cancellation.

For this reason, each node 1-9 in the MIMO enabled wireless mesh network 100 of the exemplary embodiment includes a controller (not separately depicted) scheduling use of radio resources between neighboring nodes and providing optimal routing (including optimized backhaul traffic). The controller may be implemented using any of the control system configurations known in the art, modified to provide the functionality described herein. In addition, each node also includes a memory (also not separately depicted) containing global and local routing tables accessible to the controller and structures and employed in a manner described in further detail below.

In FIG. 1A, the mesh network 100 includes nodes that need to backhaul traffic to "edge" nodes 1, 2, 3 or 4, the points at which wireline connections to a core/support network or to the Internet are provided. For example, node 8 may require such a backhaul connection via the wireless links to neighboring nodes. The problem of deciding which combination of neighboring nodes 4, 5, 7 and/or 9 providing paths to nodes 1-4 should be selected for routing packets to the core network is a conventional routing problem addressed by the prior art. Many routing algorithms for finding multiple routes between any pair of nodes are available and may be suitably employed within the network 100. Preferably the routing algorithm selected determines one or more least-cost routes, where "least-cost" is determined as the latency based on the number of hops required between the source and destination nodes, given current load conditions of the wireless links.

Once the routing algorithm has selected a destination node for a packet from node 8, however, the node needs to determine how many streams (0-N) to initiate to any particular neighboring node. Node 8 in FIG. 1B has four nearest neighbors through which packets may be routed to their final destination, with each neighboring node accommodating up to N MIMO streams. In network 100, therefore, two routing processes are incorporated: (1) a global routing definition, and (2) a local routing definition.

In the global routing problem, each node builds a table for all routes through which a packet may be routed to a particular destination node, and the number of hops required for the packet to arrive at the destination node based on one category of least-cost routing. The number of hops required will be the primary measure of the latency cost being introduced, since actual physical distance is a small indicator of latency. Given this global routing table, the transmitting node selects all routes having no more than a threshold number TH of hops, all acceptable for the purposes of this example. TABLE I below is an exemplary global routing table for node 8 in the network 100 of FIGS. 1A and 1B:

TABLE I

| Destination | Next Hop | # Hops |
|---|---|---|
| 1 | 4 | 4 |
|   | 7 | 3 |
|   | 5 | 2 |
|   | 9 | 2 |
| 2 | 4 | 3 |
|   | 7 | 2 |
|   | 5 | 2 |
|   | 9 | 3 |
| 3 | 4 | 2 |
|   | 7 | 2 |
|   | 5 | 3 |
|   | 9 | 4 |
| 4 | 4 | 1 |
|   | 7 | 2 |
|   | 5 | 3 |
|   | 9 | 4 |

In the second phase, a local routing table is completed by selecting a set of preferred routing nodes from among all of the acceptable neighboring nodes. For this purpose, each node builds a local routing table for all possible capacities available from that node to each neighboring node. TABLE II below is an exemplary local routing table for node 8 in the network 100 of FIGS. 1A and 1B, with the values represented by "CXY" (where "X" is a number that indcates the destination node and "Y" is a number that indicates the stream to the Node X) being the data rate capacity for a particular stream from an antenna element at node 8 to the identified neighboring node:

TABLE II

| Node | Stream 1 | Stream 2 | ... | Stream N |
|---|---|---|---|---|
| 4 | C41 | C42 | ... | C4N |
| 7 | C71 | C72 | ... | C7N |
| ... | ... | ... | ... | ... |
| K | Ck1 | Ck2 | ... | CkN |

Note that for the purposes of illustration each node is assumed to have N antenna elements, although in practice different nodes could have differing numbers of antenna elements (which information would be communicated on a control channel during discovery and initiation of communications between nodes) so that different rows in the local routing table might have different number of entries. In addition, the exemplary local routing table of TABLE II has been somewhat generalized by assuming that the subject node has K neighboring nodes (where K is any positive non-zero integer). The capacity values are in data rates for the corresponding stream, and the maximum potential capacities for different streams from one node to a given neighboring node are not necessarily identical.

It should be noted that the global and local routing tables need not be separate data structures as described herein, but may instead be combined, both with each other and with other operational management information for the subject node. In addition, various refinements may be utilized such as storing only acceptable next hop routes (next hops for which the number of total hops to the destination is less than the threshold TH) and associated stream capacities.

The local routing table is dynamically updated from loading information transmitted, for example, between pairs of nodes on a control channel on an ongoing periodic or intermittent basis, such that when a given neighboring node (e.g., node 4) is already receiving traffic from its other neighbors (e.g., node 3 and/or node 7), the capacity for one or more streams for that neighboring node is set to zero within the local routing table. Given that a neighboring node may already be relaying $N_1$ streams from its other neighboring nodes, that neighboring node can only accept $N-N_1$ streams from the subject node. Thus, for example, if node 4 is capable of concurrently receiving four streams in total, but is already receiving two streams from node 7 and one from node 3, only one stream remains available to receive traffic from node 8. Accordingly three of the entries for node 4 within the local routing table at node 8 would have values of zero, while the fourth would have some non-zero value.

The local routing table is employed by the controller for the subject node to determine how many streams may be initiated from the subject node to each of the neighboring nodes. With N antenna elements at each node, up to N streams may be initiated out of a given node, all to one neighboring node or distributed among some subset of up to N neighboring nodes. Any node with N antenna elements can also accept up to N streams from neighboring nodes, again either all from a single neighboring node or distributed among some subset of up to N of the neighboring nodes. As previously described, the number of streams that may be initiated to or accepted from a neighboring node is constrained by existing traffic in progress.

Using the global and local routing tables, the controller determines neighboring nodes with which streams may be initiated, and how many streams with each node, and selects both the neighboring nodes with which to initiate streams and the number of streams to initiate with each selected neighboring node on a least-cost basis. Routing of packets through the MIMO enabled mesh network 100 is thus self-adapting to load conditions at the nodes. While the exemplary embodiment employs ad hoc initiation of streams based on existing capacities, a round-robin time slot allocation scheme for receiving streams from each neighboring node, fixed or dynamic scheduling of streams between nodes based on anticipated traffic needs and/or load conditions, prioritization of selected streams over others, or some combination of all of the foregoing may alternatively be employed to control data streams between neighboring nodes.

FIG. 2 is a high level flowchart for a process of creating and maintaining global and local routing tables within a multiple-input, multiple-output enabled wireless mesh network with data stream control between neighboring nodes according to one embodiment of the present disclosure. The process 200 is performed by the controller within a given node 1-9 in MIMO enabled mesh network 100, and begins with a node becoming operational (step 201) within the network, for example by being started up in, or moving into, the geographic region of the network 100.

A determination is first made of whether any neighboring nodes have been discovered (step 202) in accordance with the known art. If so, the global routing table is updated with additional entries (step 203) to add the new node as a destination, if appropriate, and to insert next hop and number of hops information into entries for existing destination nodes. The local routing table is also updated to at least identify the number of possible streams between the subject node and the new neighboring node. This step may also be used by the process to remove entries from the global and local routing tables that correspond to any node(s) that are no longer detected by the subject node.

If no new nodes were discovered (at step 201) or after updating the global and local routing tables (at step 202), a determination is made as to whether any updated information regarding loading conditions at one or more neighboring nodes has been received (step 204). If so, the local routing table is updated (step 205) to reflect stream capacity that is no longer available or that has once again become available (after having been temporarily unavailable). Polling for discovery of new neighboring nodes and updated loading information then continues in cyclical fashion. Those skilled in the art will recognize that while the process 200 has been illustrated, for the purposes of description, as one single thread process, the functionality may alternatively be implemented as a number of separate processes and/or threads, in an event-driven manner, etc.

FIG. 3 is a high level flowchart for a process of scheduling streams within a multiple-input, multiple-output enabled wireless mesh network with data stream control between neighboring nodes according to one embodiment of the present disclosure. The process 300 is also performed by the controller within a given node 1-9 in MIMO enabled mesh network 100, and begins with a data transfer being initiated that requires the subject node to relay packets through one or more neighboring nodes.

Initially, a determination is made of acceptable next hops within routes from the subject node to the destination from the global routing table, as well as current stream capacity availability for those next hops from the local routing table (step 302). Based on that information, one or more neighboring nodes to which the data may be forward are selected and one or more streams, either to a single node or uniformly or non-uniformly distributed among a number of nodes, for transmitting the data are initiated (step 303). The process then becomes idle (step 304) until another data transfer is initiated at the subject node. As with the process 200 depicted in FIG. 2, those skilled in the art will recognize that the process 300 may alternatively be implemented as a number separate processes and/or threads, in an event-driven manner, etc.

Use of MIMO stream control for spatial channels establishing different data paths between a single pair of nodes within a wireless mesh network as described herein is equally applicable to backhauling data to edge nodes and to routing multiple streams between a node pair within an ad hoc wireless network. Scheduling use of spatial channels can optimize network throughput while avoiding processing overload and reducing co-channel interference.

It should be noted that while a fully functional system has been described herein, those skilled in the art will appreciate that at least portions of the functionality described are capable of being implemented and distributed in the form of a machine usable medium containing instructions in a variety of forms, and that the resulting advantages apply equally regardless of the particular type of signal bearing medium utilized to actually carry out the implementation and/or distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links and frames or packets.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A scheduling system, comprising:
   at least one data structure containing information for a node within a multiple-input, multiple-output enabled mesh network, the information including available stream capacity for receiving up to N streams for each selected neighboring node having N antennae, wherein the node has a plurality of the selected neighboring nodes within the mesh network; and
   a controller, located at the node, configured to selectively utilize the available stream capacity information to determine M number of data streams to transmit to the selected neighboring nodes by subtracting a number of currently relaying stream at the each selected neighboring node having N antennae from the available stream capacity for receiving up to N streams for the each selected neighboring node having N antennae to control a route of a transmission of each data stream from the node to the selected neighboring nodes,
   wherein the available stream capacity is based in part on a number of antennae of the neighboring node.

2. The scheduling system according to claim 1, wherein the at least one data structure includes, for each of a plurality of destination nodes within the mesh network, an identification of next hop nodes through which data may be routed from the node to the respective destination node and, for each next hop node identified for the respective destination node, information regarding latency associated with routing data through that next hop node to the respective destination node, and
   wherein the controller is configured to employ the latency information to select the one or more selected neighboring nodes from among the next hop nodes.

3. The scheduling system according to claim 1, wherein the at least one data structure contains, for each possible stream between the node and a selected neighboring node, available capacity for the respective stream.

4. The scheduling system according to claim 3, wherein the available capacity for each possible stream between the node and the selected neighboring node is dynamically updated.

5. The scheduling system according to claim 1, further comprising:
   N antennae or antenna elements each configured to concurrently receive different data in one of the up to N streams, each of the up to N concurrent streams originating from one or more of a plurality of neighboring nodes,
   wherein the controller is configured to dynamically update each of the plurality of neighboring nodes regarding available capacity for each of the up to N streams.

6. The scheduling system according to claim 1, further comprising:
   N antennae or antenna elements each configured to concurrently transmit different data in one of the up to N streams, wherein the up to N concurrent streams are directed to the one or more selected neighboring nodes,
   wherein the controller is configured to direct streams from each of the N antennae or antenna elements to the one or more selected neighboring nodes based on:
      latency associated with routing data through each of a plurality of neighboring nodes within the mesh network to a destination node within the mesh network, wherein the plurality of neighboring nodes includes the one or more selected neighboring nodes and the selected neighboring nodes are selected by the controller from among the plurality of neighboring nodes based on the associated latency, and
      available stream capacity at each of the one or more selected neighboring nodes.

7. The scheduling system of claim 1, further including a second data structure containing information for the node associating one or more destination nodes with one or more next hop nodes, the information also associating the destination node and the next hop node with the number of hops between the node and the destination node via the next hop node, wherein the controller is further configured to utilize the information contained in the second data structure to control transmission of at least one data stream from the node to the at least one selected neighboring node, and wherein the node, the next hop nodes, and the destination nodes are base transceiver stations in the mesh network and the destination nodes are connected to a core network.

8. A scheduling method, comprising:
   providing at least one data structure containing information for a node within a multiple-input, multiple-output enabled mesh network, the information including available stream capacity for receiving up to N streams for each selected neighboring node having N antennae, wherein the node has a plurality of the selected neighboring nodes within the mesh network; and
   selectively utilizing, by the node, the available stream capacity information to determine M number of data streams to transmit to the selected neighboring nodes by subtracting a number of currently relaying stream at the each selected neighboring node having N antennae from the available stream capacity for receiving up to N streams for the each selected neighboring node becomes zero and to control a route of a transmission of each data stream from the node to at least one of the selected neighboring nodes,
   wherein the available stream capacity is based in part on a number of antennae of the neighboring node.

9. The method according to claim 8, further comprising:
   storing within the at least one data structure, for each of a plurality of destination nodes within the mesh network, an identification of next hop nodes through which data may be routed from the node to the respective destination node and, for each next hop node identified for the respective destination node, information regarding latency associated with routing data through that next hop node to the respective destination node; and
   employing the latency information to select the one or more selected neighboring nodes from among the next hop nodes.

10. The method according to claim 8, further comprising:
storing within the at least one data structure contains, for each possible stream between the node and a selected neighboring node, available capacity for the respective stream.

11. The method according to claim 10, further comprising:
dynamically updating the available capacity for each possible stream between the node and the selected neighboring node.

12. The method according to claim 8, further comprising:
concurrently receiving different data in one of the up to N streams at N antennae or antenna elements, each of the up to N concurrent streams originating from one or more of a plurality of neighboring nodes; and
dynamically updating each of the plurality of neighboring nodes regarding available capacity for each of the up to N streams.

13. The method according to claim 8, further comprising:
concurrently transmitting different data in one of the up to N streams using N antennae or antenna elements, wherein the up to N concurrent streams are directed to the one or more selected neighboring nodes; and
directing streams from each of the N antennae or antenna elements to the one or more selected neighboring nodes based on:
  latency associated with routing data through each of a plurality of neighboring nodes within the mesh network to a destination node within the mesh network, wherein the plurality of neighboring nodes includes the one or more selected neighboring nodes and the selected neighboring nodes are selected by the controller from among the plurality of neighboring nodes based on the associated latency, and
  available stream capacity at each of the one or more selected neighboring nodes.

14. The method according to claim 8, further comprising:
operating a plurality of nodes including at least the node and the one or more selected neighboring nodes,
each of the plurality of nodes including N antennae or antenna elements capable of concurrently transmitting different data in up to N streams.

15. A multiple-input, multiple-output enabled mesh network with stream control, comprising:
a plurality of nodes, each node within the plurality of nodes including:
  up to N antennae or antenna elements capable of receiving different data in up to N streams each from the node to one or more selected neighboring nodes within the mesh network, and
  at least one data structure containing information for the node, the information including available stream capacity for receiving the up to N streams from the node to each selected neighboring node having N antennae, wherein the node has a plurality of the selected neighboring nodes; and
a controller configured to selectively utilize the available stream capacity information to determine M number of data streams to transmit to the selected neighboring nodes by subtracting a number of currently relaying stream at the each selected neighboring node having N antennae from the available stream capacity for receiving up to N streams for the each selected neighboring node having up to N antennae and to control a route of a transmission of each data stream from the node to the selected neighboring nodes,
wherein at least one node within the plurality of nodes is communicably coupled to an external network, the at least one node forming a destination node for backhaul traffic from other nodes within the plurality of nodes to the external network,
wherein the available stream capacity is based in part on a number of antennae of the neighboring node.

16. The network according to claim 15, further comprising:
wireless links between each of the plurality of nodes and nodes within the plurality of nodes neighboring the respective node, wherein each wireless link includes multiple spatial channels capable of carrying different data between the two nodes connected by the respective wireless link.

17. The network according to claim 15, wherein the at least one data structure for each of the plurality of nodes contains, for each destination node within the plurality nodes, an identification of every neighboring, next hop node within the plurality of nodes through which data may be routed from the respective node to the respective destination node and, for each neighboring, next hop node identified for the respective destination node, information regarding latency associated with routing data through that neighboring, next hop node to the respective destination node, and
  wherein the controller is configured to employ the latency information to select the one or more selected neighboring nodes from among the neighboring, next hop nodes.

18. The network according to claim 15, wherein the at least one data structure for each of the plurality of nodes contains, for each possible stream between the respective node and any neighboring node within the plurality of nodes, available capacity for the respective stream.

19. The network according to claim 18, wherein the controller is configured to dynamically update every neighboring node within the plurality of nodes regarding the available capacity for all possible streams between the respective node and any neighboring node within the plurality of nodes, and to receive updates from each of the neighboring nodes regarding available capacity for each possible stream between the respective neighboring node and any nodes within the plurality of nodes that neighbor the respective neighboring nodes.

20. The network according to claim 15, wherein the controller is configured to direct streams from each of the N antennae or antenna elements to the one or more selected neighboring nodes based on:
  latency associated with routing data through each of a plurality of neighboring nodes within the mesh network to a destination node within the mesh network, wherein the plurality of neighboring nodes includes the one or more selected neighboring nodes and the selected neighboring nodes are selected by the controller from among the plurality of neighboring nodes based on the associated latency, and
  available stream capacity at each of the one or more selected neighboring nodes.

* * * * *